US008829063B2

(12) United States Patent
Song et al.

(10) Patent No.: US 8,829,063 B2
(45) Date of Patent: Sep. 9, 2014

(54) HIGH HEAT RADIATION COMPOSITE AND A METHOD OF FABRICATING THE SAME

(75) Inventors: Kyong Hwa Song, Seoul (KR); Han Saem Lee, Gyeonggi-do (KR); Jin Woo Kwak, Gyeonggi-do (KR); Byung Sam Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 77 days.

(21) Appl. No.: 13/540,842

(22) Filed: Jul. 3, 2012

(65) Prior Publication Data

US 2013/0237621 A1   Sep. 12, 2013

(30) Foreign Application Priority Data

Mar. 8, 2012  (KR) .................. 10-2012-0024049

(51) Int. Cl.
*C08J 9/26* (2006.01)
*C08J 9/16* (2006.01)

(52) U.S. Cl.
USPC ................................. 521/61; 521/55; 521/59

(58) Field of Classification Search
USPC ............................... 521/55, 59, 61
See application file for complete search history.

(56) References Cited

U.S. PATENT DOCUMENTS

| 6,444,714 B1* | 9/2002 | Gluck et al. ............... 521/56 |
| 2004/0054020 A1* | 3/2004 | Maletzko et al. ........... 521/50 |
| 2012/0219719 A1* | 8/2012 | Yu ............................. 427/358 |

FOREIGN PATENT DOCUMENTS

| EP | 0994145 | * 4/2000 | ............ C08J 9/00 |
| KR | 10-2006-0038862 | 5/2006 | |
| KR | 10-2004-0108392 | * 6/2006 | ............ C08J 9/08 |
| KR | 10-0780926 | 11/2007 | |
| KR | 10-2009-0051670 | 5/2009 | |
| WO | 0006635 A1 | 2/2000 | |

OTHER PUBLICATIONS

Cerezo et al., "Morphology, Thermal Stability, and Mechanical Behavior of [Poly(propylene)-grafted Maleic Anhydride]-Layered Expanded Graphite Oxide Composites," Macromolecular Materials and Engineering, 2007, 292, pp. 155-168.*

* cited by examiner

*Primary Examiner* — Kara Boyle
(74) *Attorney, Agent, or Firm* — Edwards Wildman Palmer LLP; Peter F. Corless

(57) ABSTRACT

The present disclosure provides a high heat radiation composite material including a hybrid filler comprising expanded graphite filled with expandable polymeric beads, and a fabrication method thereof. In the method, a dispersion solution is prepared by dispersing expandable polymeric beads in ethanol. Expanded graphite is immersed in the dispersion solution, and heat-treated to remove ethanol, thereby producing the hybrid filler. The hybrid filler is dispersed into the matrix polymer via an extrusion/injection process, thereby producing the composite material.

15 Claims, 3 Drawing Sheets

HIGH HEAT RADIATION COMPOSITE AND A METHOD OF FABRICATING THE SAME

CROSS-REFERENCE TO RELATED APPLICATION

This application claims under 35 U.S.C. §119(a) the benefit of Korean Patent Application No. 10-2012-0024049 filed Mar. 8, 2012, the entire contents of which are incorporated herein by reference.

BACKGROUND (a) Technical Field

The present invention relates to a high heat radiation composite including a hybrid filler comprising expanded graphite filled with expandable polymeric beads, which is dispersed in a matrix polymer, and a fabrication method thereof. More particularly, it relates to a high heat radiation composite including a hybrid filler comprising expanded graphite filled with expandable polymeric beads that has been heat-treated and dispersed into a matrix polymer by an extrusion/injection process. The composite has better heat radiation characteristics than a typical heat-radiating composite, overcomes thermal anisotropy, and may be utilized as a material for battery cases and housing and plates interposed between pouch cells in a cell module of a battery system for an electric vehicle.

(b) Background Art

Generally, thermal runaway is a phenomenon that hinders the efficiency and reliability of batteries due to local temperature differences or high heat caused by high-speed charging, high power, and repeated charging occurs in batteries for electric vehicles. Thermal runaway may result from a deficiency or lack of external thermal diffusion capacity compared to the internal heat generated by batteries.

Generally, materials that are being used for battery cases and housings have a mineral filler, e.g., an incombustible filler is filled in a plastic base material such as PC+ABS, PA and PP by 20 wt % to 30 wt %. These materials provide beneficial characteristics such as flame resistance, chemical resistance, insulation, and durability. However, these materials do not provide good heat radiation characteristics. In the case of heat radiation composites that are being developed, thermal anisotropy generally occurs due to the orientation of a filler in an injection process; however, there is a significant limitation in achieving high heat conduction in such composites because a heat transfer resistance occurs at the interfaces between components such as, for example, filler and resin.

Generally, high heat radiation fillers are used as a polymer-based heat radiation composite material, and high heat radiation fillers having a planar shape are advantageous. In the case of fibrous or globular fillers, the contact between fillers is not a plane contact but rather a point contact, and thus the transfer efficiency of the lattice vibrator (phonon) may be rapidly reduced. Examples of planar high heat radiation filler include boron nitride and graphite.

When a sample is manufactured by injection-molding a composite resin densely filled with planar particles, the planar particles are oriented in one direction by a shear force applied in the injection direction, causing anisotropy of thermal conductivity. In addition, a densely filled heat radiation composite material manufactured by typical injection molding has limitations of workability reduction due to low resin flowability, high price of filler, and weight increase.

Hybrid fillers in which two types of filler, planar fillers and globular fillers, have a limitation in that their heat transfer efficiency cannot be maximized due to weight increase by the thick filling of the whole filler and relatively low thermal conductivity of globular particles. Also, the thermal energy transfer capacity is reduced due to scattering of phonon in pores of the filled particles and the polymer resin filled in between the globular particles and planar particles.

Typical examples of heat transfer resistance factors of polymer-based heat radiation composite materials include an interfacial resistance between matrix resin and filler, a resistance due to defects in filler, and a resistance occurring in a contact portion between fillers. These resistance factors cause the heat conduction efficiency to be significantly reduced.

The interfacial resistance between matrix resin and filler is in association with the interfacial stability. For this, resin needs to be fully impregnated into the surface of filler, and thus the mechanical properties can simultaneously increase. The resistance due to defects in filler is determined by physical factors in the selection stage and the pretreatment stage of filler. The interfacial resistance at the contact points between fillers may be minimized by maximizing a surface contact between fillers. For this, a densification process for the surface contact between planar particles is needed. Since the densification process of planar particles is essential for the efficiency of phonon transfer, but may cause a collapse of a bulky network, the densification process of planar particles needs to be induced while maintaining the network of particles.

Attempts to overcome these problems have implemented a composite containing expanded graphite or expandable polymer. For example, a polymer/graphene nano composite material with good conductivity manufactured by effectively dispersing graphite-based graphite materials such as graphene, expanded graphite, or undenatured graphite in a polymer matrix. Unfortunately, since graphite has a small amount of polar group on the surface thereof, it is difficult to effectively disperse graphite in a polymer. Also, since planar particles are not densified, the thermal conductivity is low.

Other attempts to overcome these problems have implemented a nano composite with an expanded graphite/epoxy nano composite composition and a nano composite, which has excellent thermal and mechanical characteristics. For example, a nano composite, that is manufactured by fusing and mixing acid-treated and heat-treated expanded graphite with epoxy resin, may have limited anisotropy due to the particle shape of the expanded graphite.

Accordingly, there is a need for a material that can effectively radiate heat generated in batteries to increase the lifespan and the reliability of a high capacity battery package for an electric vehicle, which can be disposed between a pouch type of lithium ion batteries as an interfacial plate material or can be used for upper and lower plate covers (hereinafter, referred to as housing) for effectively coupling a fixed battery cell and an interfacial plate module and increasing their durability.

SUMMARY OF THE DISCLOSURE

The present invention provides a high heat radiation composite in which hybrid filler heat-treated after expandable polymeric beads are filled in the pore spaces formed when planar particles of expanded graphite are dispersed into matrix polymer, thereby providing a high heat radiation composite that can achieve the heat transfer characteristics and simultaneously overcome thermal anisotropy.

In one exemplary embodiment, the present invention provides a high heat radiation composite containing hybrid filler, wherein the hybrid filler is formed by filling expandable polymeric beads in expanded graphite and performing heat treatment, and is dispersed into matrix polymer.

In another exemplary embodiment, the present invention provides a method for manufacturing a high heat radiation composite containing hybrid filler, including: manufacturing a dispersion solution by dispersing expandable polymeric beads in ethanol; immersing expanded graphite in the dispersion solution in which the expandable polymeric beads are dispersed; manufacturing the hybrid filler by heat-treating the dispersion solution in which the expanded graphite is immersed to remove ethanol; and manufacturing the high heat radiation composite containing the hybrid filler through an extrusion/injection process for manufacturing a sample by dispersing the manufactured hybrid filler into matrix polymer.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated by the accompanying drawings, which are given hereinbelow by way of illustration only, and thus are not limitative of the present invention, and wherein.

Figure 1:
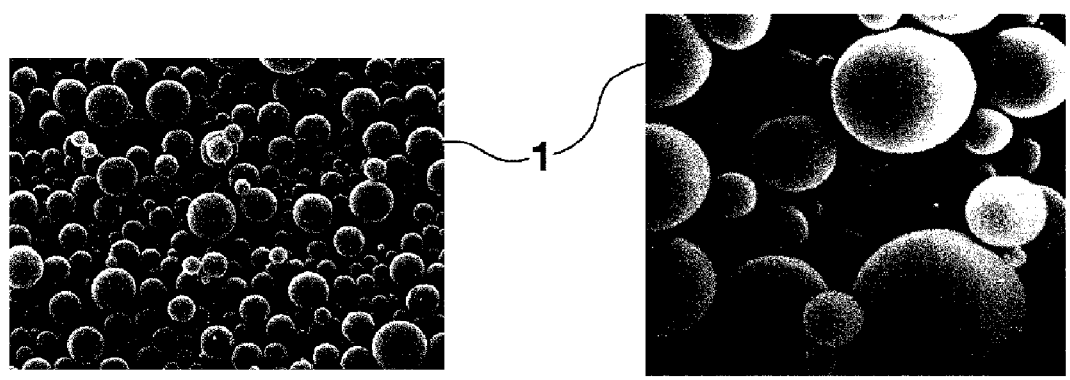
FIG. 1 is a view illustrating the shape of expandable polymeric bead in an exemplary embodiment of the present invention.
Figure 2:
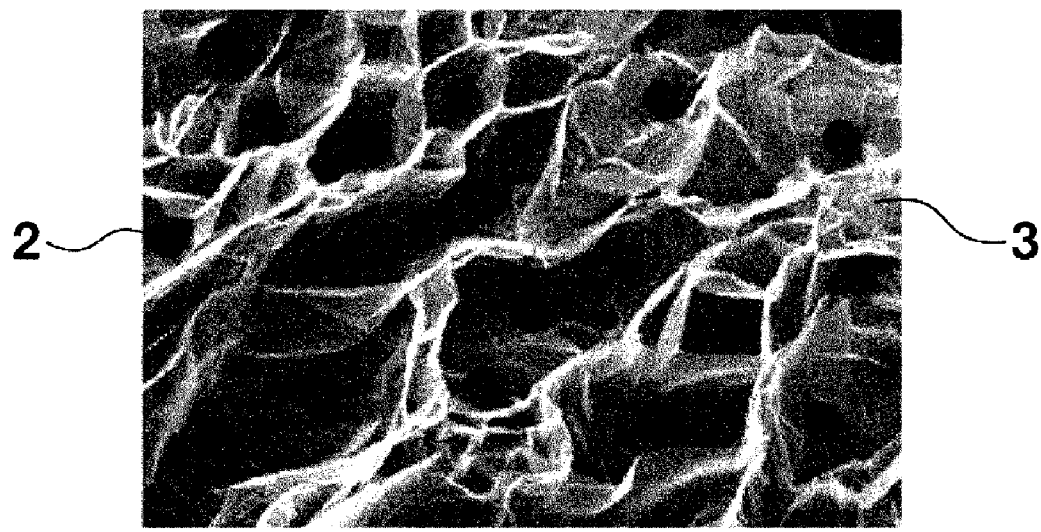
FIG. 2 is a view illustrating hybrid filler according to an exemplary embodiment of the present invention.

Reference numerals set forth in the Drawings includes reference to the following elements as further discussed below:

1: expandable thermoplastic bead
2: shape of expandable thermoplastic bead inserted into EG pores
3: expanded graphite plate
4: solution (ethanol)
5: expandable thermo plastic bead before expansion
6: expanded graphite plate
7: EG pores in which ethanol is removed and E-beads are filled and expanded
8: densification of expanded graphite plate
9: network of graphite plate expanded and densified
10: expandable thermoplastic beads after expansion
11: heat transfer path
12: thermoplastic matrix It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

The above and other features of the invention are discussed infra. Hereinafter, an exemplary embodiment of the present invention will be described in detail with reference to the accompanying drawings.

The present invention provides a high heat radiation composite comprising hybrid filler, in which the hybrid filler is heat-treated after expandable polymeric beads are filled in expanded graphite, and then dispersed into matrix polymer.

The expansion coefficient of the expanded graphite may range from about 200 to about 400, which represents the quotient of expandable graphite's post-heating expansion volume and original sample mass.

When the expansion coefficient is outside of this range, pores by expansion may not be formed. More preferably, the expansion coefficient of the graphite may range from about 300 to about 350. Herein, the term "expansion" refers to a process in which a pressure is applied to the planar particles to allow the stacked planar particles to become apart from each other, and the edge portions of the particles adhere to each other to form pores three-dimensionally while intercalant filled between planar particles is being evaporated by a heat-treatment process of about 500° C. to about 600° C.

According to an exemplary embodiment, the expanded graphite may have a stacked planar structure. The expanded graphite may be manufactured by acid-treating and heat-treating the planar structure of graphite, and may have a lower bulk density and a wider surface area than that of typical graphite. Micro voids may be formed between planar particles, which show very excellent characteristics in hygroscopicity due to the capillary phenomenon. The average particle size of the expanded graphite may range from about 600 µm to about 1,500 µm, and the size of pores formed may range from about 1 µm to about 15 µm. Also, since a porous network is effectively formed between planar particles, the expanded graphite may be very advantageous for providing the heat transfer characteristics. However, since anisotropy or pore network collapse may be caused by a shear force during the injection process, there is a limitation in improving the thermal characteristics only with the expanded graphite.

The expandable polymeric beads (expandable microbead; E-bead) may be in the form of granules in which the core is a liquefied hydrocarbon and the shell is a thermoplastic resin. The expandable polymeric bead may be microbeads with a mechanism in which when heated, the plastic shell portion is softened, and the core portion in a liquid state increases in pressure, allowing the particles to expand. The microbead may include various grades of commercial products (e.g., Expancel). The average particle size of the expandable polymeric beads may range from about 1 µm to about 10 µm, and more preferably, from about 2 µm to about 3 µm.

The mixture ratio of the expanded graphite to the expandable polymeric beads may range from about (5 to 20):(10 to 40). When the amount of the expanded graphite is larger than that of the expandable polymeric beads, the expandable polymeric beans may not be fully filled in the expanded graphite, reducing the improvement of the heat transfer characteristics due to the expansion of beads. On the other hand, when the amount of the expanded graphite is smaller than that of the expandable polymeric beads, the polymeric beads with low thermal conductivity may disperse into the matrix instead of the graphite pores. Accordingly, there is a limitation in that the thermal conductivity of the composite manufactured may be rapidly reduced.

After the expandable polymeric beads are filled into the micro spaces of the expanded graphite through heat treatment, the beads may be expanded by heat treatment to induce a densification process of planar particles, increasing the efficiency of phonon transfer by increasing the surface contact between particles and simultaneously maintaining the pore network structure formed in the expanded graphite.

In an exemplary embodiment, the matrix polymer may be comprised of one selected from the group consisting of polyethylene, polypropylene, polystyrene, polyalkylene terephthalate, polyamide resin, polyacetal resin, polycarbonate, polysulfone, and polyimide.

The expanded graphite and expandable polymeric beads of the high heat radiation composite may be enlarged from the initial average particle sizes of the expanded graphite and the expandable polymeric beads to the average particle sizes of about 900 µm to about 2,000 µm and about 3 µm to about 5 µm, respectively. The average particle sizes may increase about 1.5 times compared to the initial average particles sizes. Compared to a typical PA6-based graphite composite, the thermal conductivity of the high heat radiation composite may range from about 10 W/mK to about 20 W/mK in both injection and thickness directions at a filling ratio of about 40 wt % to about 50 wt %.

The high heat radiation composite according to an exemplary embodiment of the present invention may be manufactured as follows.

First, a dispersion solution may be prepared by dispersing expandable polymeric beads in ethanol. Next, expanded graphite may be immersed in the dispersion solution in which the expandable polymeric beads are dispersed. Next, the hybrid filler may be manufactured by heat-treating the dispersion solution in which the expanded graphite is immersed to remove ethanol. Next, the high heat radiation composite containing the hybrid filler may be manufactured through an extrusion/injection process for manufacturing a sample by dispersing the hybrid filler into a matrix polymer.

The content of the expandable polymeric beads may be about 10 wt % based on the total weight of the ethanol and the expanded graphite.

During manufacturing of the hybrid filler, the temperature of the heat treatment may range from about 80° C. to about 120° C., and in this case, which expands the expandable polymeric beads to achieve a densification effect between planar particles of the expanded graphite.

In the extrusion/injection process, the content of the hybrid filler may range from about 40 wt % to about 50 wt % based on the total weight of the matrix polymer. When the amount of the hybrid filler is greater than about 50 wt %, the mechanical properties of the sample may be deteriorated. On the other hand, when the amount of the hybrid filler is smaller than about 40 wt %, a heat transfer path between fillers (e.g., a pore structure) may not be formed, or sufficiently formed, thereby failing to achieve a desired thermal conductivity.

In the extrusion/injection process, the injection temperature may range from about 180° C. to about 280° C., so that the expandable polymeric beads may be secondarily expanded, which widens the interval between plates of the expanded graphite to facilitate impregnation of polymer resin into the surface of the filler. Accordingly, the interfacial stability between resin and filler may be improved, leading to an improvement of the mechanical properties of the composite and a reduction of the heat transfer interfacial phenomenon between resin and filler.

Hereinafter, the present invention will be described in more detail based on an exemplary embodiment, but the present invention will not be limited thereto.

EXAMPLES

Manufacture of Composite Containing Hybrid Filler

The following examples illustrate exemplary embodiments of the invention and are not intended to limit the same.

Expandable polymeric beads (expandable microbead: E-bead) having a weight of about 10 g to about 40 g and a size of about 2 mm to about 3 mm may be dispersed in 100 ml ethanol by stirring under mild conditions (e.g., about 100 rpm) of ordinary temperature. 5 g to 20 g expanded graphite (EG) may be immersed in the E-bead ethanol dispersion solution, and then the dispersion solution may be incubated for about 30 minutes at room temperature (e.g., about 25° C.).

Thereafter, the dispersion solution may be heated to a temperature of about 80° C. or higher to remove the ethanol, and the E-bead may be expanded to induce densification of planar particles while maintaining the porous network. As the hybrid filler is manufactured, secondary expansion of E-beads dispersed in polyamide (PA6) matrix resin may occur during the extrusion or injection process. While the pores are being enlarged, the resin impregnation interruption phenomenon due to the capillary phenomenon may disappear, and the impregnation of molten PA6 resin into the enlarged pores of the expanded graphite may be improved.

TEST EXAMPLES

Heat Conduction Characteristics of Composite Containing Hybrid Filler

With a filling ratio of about 40 wt % to about 50 wt %, the thermal conductivity of a typical PA6-based graphite composite shows about 5.0 W/mK to about 8.0 W/mK in the injection direction (in-plane) and about 2.0 to about 3.0 W/mK in the thickness direction (through-plane), and shows distinct anisotropic characteristics. However, with the filling ratio typically used in a conventional art composite, the expanded graphite-E bead hybrid composite sample shows the heat conduction characteristics of about 10 W/mK or more in both injection and thickness directions.

Figure 3:
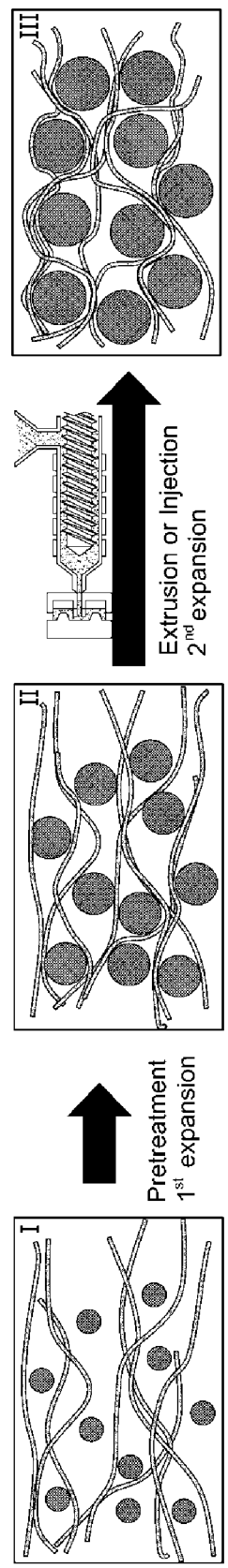
FIG. 3 is a view illustrating the microstructure of a high heat radiation composite by stages according to an exemplary embodiment of the present invention.

Accordingly, as shown in FIG. 3, while the contact surface between the expanded graphite plates is being increased by the densification process using the E-bead, the porous network structure may be maintained, and the heat transfer path may be effectively formed through the network, maximizing the contact area between the filler interfaces to improve the heat transfer characteristics, solving the thermal anisotropy due to globular bead particles, and minimizing the interfacial resistance between filler and resin.

According to embodiments of the present invention, a high heat radiation composite that has excellent heat radiation characteristics compared to typical heat radiation composites and may over overcome the thermal anisotropy may be manufactured by heat treating expanded graphite and thermally expandable microbeads to form hybrid filler and dispersing the hybrid filler into matrix polymer to manufacture a composite through an extrusion/injection process.

Also, the high heat radiation composite can be utilized as a material for a plate disposed between pouch cells in a cell module of a battery system for an electric vehicle with improved reliability, safety and lifespan, and a material for a battery case and housing.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a high heat radiation composite containing a hybrid filler, comprising:
   (a) preparing a dispersion solution by dispersing expandable polymeric beads in ethanol; (b) immersing an expanded graphite in the dispersion solution; (c) heat-treating the dispersion solution of step (b) to remove the ethanol, thereby producing the hybrid filler; and (d) dispersing the hybrid filler into a matrix polymer by an extrusion or injection process, thereby manufacturing the high heat radiation composite,
   wherein the expanded graphite has pores.

2. The method of claim 1, wherein the expandable polymeric beads are about 10 wt % based on the total weight of the ethanol and the expanded graphite.

3. The method of claim 1, wherein step (c) comprises heat-treating the dispersion solution at a temperature that ranges from about 80° C. to about 120° C.

4. The method of claim 1, wherein the expandable polymeric beads are primarily expanded.

5. The method of claim 1, wherein in the extrusion/injection process, a content of the hybrid filler ranges from about 40 wt % to about 50 wt % based on the total weight of the matrix polymer.

6. The method of claim 1, wherein the extrusion or injection process occurs at a temperature that may range from about 180° C. to about 280° C.

7. The method of claim 4, wherein the extrusion or injection process secondarily expands the expandable polymeric beads, and the pores of the expanded graphite are enlarged.

8. The method of claim 1, wherein the expanded graphite has an expansion coefficient that ranges from about 200 to about 400.

9. The method of claim 1, wherein the expanded graphite has an average particle size that ranges from about 600 μm to about 1,500 μm.

10. The method of claim 1, wherein the expandable polymeric beads have an average particle size that ranges from about 1 μm to about 10 μm.

11. The method of claim 1, wherein the expanded graphite and the expandable polymeric beads have a mixture ratio that ranges from about 5-20:about 10-40.

12. The method of claim 1, wherein the matrix polymer is selected from the group consisting of polyethylene, polypropylene, polystyrene, polyalkylene terephthalate, polyamide resin, polyacetal resin, polycarbonate, polysulfone, and polyimide.

13. The method of claim 1, wherein the expanded graphite has an average particle size that ranges from about 900 μm to about 2,000 μm.

14. The method of claim 1, wherein the expandable polymeric beads have an average particle size that ranges from about 3 μm to about 5 μm.

15. The method of claim 1, wherein the high heat radiation composite manufactured by the method has a thermal conductivity of about 10 W/mk to about 20 W/mk.

* * * * *